United States Patent
Yoon et al.

(10) Patent No.: US 11,282,124 B1
(45) Date of Patent: Mar. 22, 2022

(54) AUTOMATED IDENTIFICATION OF ITEM ATTRIBUTES RELEVANT TO A BROWSING SESSION

(71) Applicant: Amazon Technologies, Inc., Seattle, WA (US)

(72) Inventors: Sungro Yoon, Redman, WA (US); Soo-Min Pantel, Bellevue, WA (US); Pranav Varia, Bothell, WA (US); Opeyemi Akanji, Renton, WA (US); Daniel Lloyd, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 16/403,029

(22) Filed: May 3, 2019

(51) Int. Cl.
G06Q 30/00 (2012.01)
G06Q 30/06 (2012.01)
G06F 16/33 (2019.01)

(52) U.S. Cl.
CPC ..... *G06Q 30/0631* (2013.01); *G06F 16/3344* (2019.01); *G06Q 30/0603* (2013.01)

(58) Field of Classification Search
None
See application file for complete search history.

(56) References Cited

U.S. PATENT DOCUMENTS

| | | | | |
|---|---|---|---|---|
| 7,197,479 B1 * | 3/2007 | Franciscus de Heer | | G06F 16/9535 705/26.62 |
| 7,603,367 B1 * | 10/2009 | Kanter | | G06F 16/00 |
| 7,647,309 B1 * | 1/2010 | Bar | | G06Q 30/06 707/713 |
| 8,117,085 B1 * | 2/2012 | Smith | | G06Q 30/0641 705/26.7 |
| 8,290,818 B1 * | 10/2012 | Levitan | | G06Q 30/0631 705/26.7 |
| 8,560,398 B1 * | 10/2013 | Gregov | | G06Q 30/06 705/26.2 |
| 8,732,101 B1 * | 5/2014 | Wilson | | G06F 16/9535 706/15 |
| 9,607,325 B1 * | 3/2017 | Sriram | | G06Q 30/0282 |
| 9,727,644 B1 * | 8/2017 | Teng | | G06Q 50/01 |
| 9,779,441 B1 * | 10/2017 | Jadhav | | G06F 16/248 |

(Continued)

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003).*

*Primary Examiner* — Naeem U Haq
(74) *Attorney, Agent, or Firm* — Knobbe, Martens, Olson & Bear, LLP

(57) ABSTRACT

Systems and methods are provided for electronic catalog user experience improvements based on extracted item attributes. An example method includes obtaining information identifying items viewed during a user browsing session, the items being included in an electronic catalog, and the electronic catalog being organized according to a hierarchy, with the hierarchy comprising a plurality of categories. Information identifying attributes associated with the identified items is identified, and the attributes are ranked according to attribute relevance score. Items are determined for recommendation to the user based on the ranked attribute relevance scores, with the determined items being selected from items included in the electronic catalog which are also associated with a same category as the identified items.

13 Claims, 8 Drawing Sheets

(56) References Cited

U.S. PATENT DOCUMENTS

| | | | | |
|---|---|---|---|---|
| 9,904,949 | B1* | 2/2018 | Tavernier | G06Q 30/0631 |
| 10,706,450 | B1* | 7/2020 | Tavernier | G06Q 30/0625 |
| 10,796,355 | B1* | 10/2020 | Price | G06F 16/90324 |
| 10,861,077 | B1* | 12/2020 | Liu | G06Q 30/0601 |
| 2013/0101217 | A1* | 4/2013 | Lee | G06F 16/00 382/190 |
| 2014/0372250 | A1* | 12/2014 | Dugan | G06Q 30/0269 705/26.7 |
| 2018/0341907 | A1* | 11/2018 | Tucker | G06Q 30/0623 |
| 2019/0385219 | A1* | 12/2019 | Ouyang | G06N 5/048 |
| 2020/0151762 | A1* | 5/2020 | Yang | G06N 20/00 |
| 2020/0151763 | A1* | 5/2020 | Yang | G06Q 30/0242 |
| 2021/0034634 | A1* | 2/2021 | Iyer | G06F 16/9535 |
| 2021/0034683 | A1* | 2/2021 | Iyer | G06Q 30/0603 |

\* cited by examiner

400

Hello User A

402 Hat A

Description: Lorem ipsum dolor sit amet, consectetur adipiscing elit. Morbi commodo risus magna, a vestibulum lacus eleifend nec. Praesent vitae augue vel dolor blandit feugiat eu ut mauris.

Why was I recomended this? You previously viewed Hats with Attributes A, B, and C
408

404 Hat B

Description: Pellentesque auctor non diam non pulvinar. Donec placerat dictum faucibus. Fusce condimentum, purus vitae fermentum maximus, leo erat elementum tellus, non venenatis nisi risus non nulla.

406 Hat C

Description: Lorem ipsum dolor sit amet, consectetur adipiscing elit. Morbi commodo risus magna, a vestibulum lacus eleifend nec. Praesent vitae augue vel dolor blandit feugiat eu ut mauris.

FIG. 4A

AUTOMATED IDENTIFICATION OF ITEM ATTRIBUTES RELEVANT TO A BROWSING SESSION

TECHNICAL FIELD

The present disclosure relates to systems and techniques for personalized item recommendations. More specifically, this disclosure relates to improvements in personalized item recommendations based on item attributes.

BACKGROUND

Electronic catalogs may be accessible via electronic pages, such as web pages or content pages displayed by a mobile shopping application, with the electronic pages providing front-end user interfaces into the electronic catalogs. An example electronic page may enable users to provide verbal or textual user input identifying items of interest. The example electronic page may then update to present items responsive to the user input. Some electronic pages may additionally cause recommended items to be presented to a user. These recommended items may be based on user-ratings provided by other users. For example, the other users may indicate numerical ratings of items. The recommended items may also be based on items which other users have viewed.

As an example, a user may request that an electronic catalog identify hats associated with a particular sports team. The electronic catalog, such as via an electronic page, may then present items which depict a logo of, or are otherwise associated with, the particular sports team. However, some of the identified items may not correspond with the request. For example, the electronic catalog may enable third-party entities to include their items in the electronic catalog. In this example, there may be hundreds of millions, or billions, of items in the electronic catalog. Due to this immense quantity of items, the electronic catalog may organize the items according to an example hierarchy. The hierarchy may distinguish items according to different categories, for example a category may include clothing items. Another example category may include hats. A third-party entity which provides an item may thus select from amongst the categories when including the item in the electronic catalog.

An example electronic catalog may allow third-party entities to provide item descriptions. In this way, users of the electronic catalog may view an item description prior to adding an item to his/her cart. It may be appreciated that these descriptions may be noisy. As an example, a third-party entity may use improper terms to drive presentation of their items. For example, an item description of a baseball hat depicting a certain team logo may include a multitude of team names. As another example, a third-party entity may use poorly written natural language sentences, or the item descriptions may include typos or uncommon terms. Thus, a user experience associated with using the electronic catalog may be reduced. For example, items may be surfaced which are not of interest to the user.

Additionally, due to a limited number of categories in the hierarchy, item recommendations may be of limited value. For example, an electronic catalog may recommend popular items included in a certain category of item. However, while these items may be popular, they may not correspond with a reason, or intention, for which a user is searching for items within the category.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 4A is another example user interface illustrating recommended items according to the techniques described herein.

Like reference numbers and designations in the various drawings indicate like elements.

DETAILED DESCRIPTION

Introduction

Figure 1A:
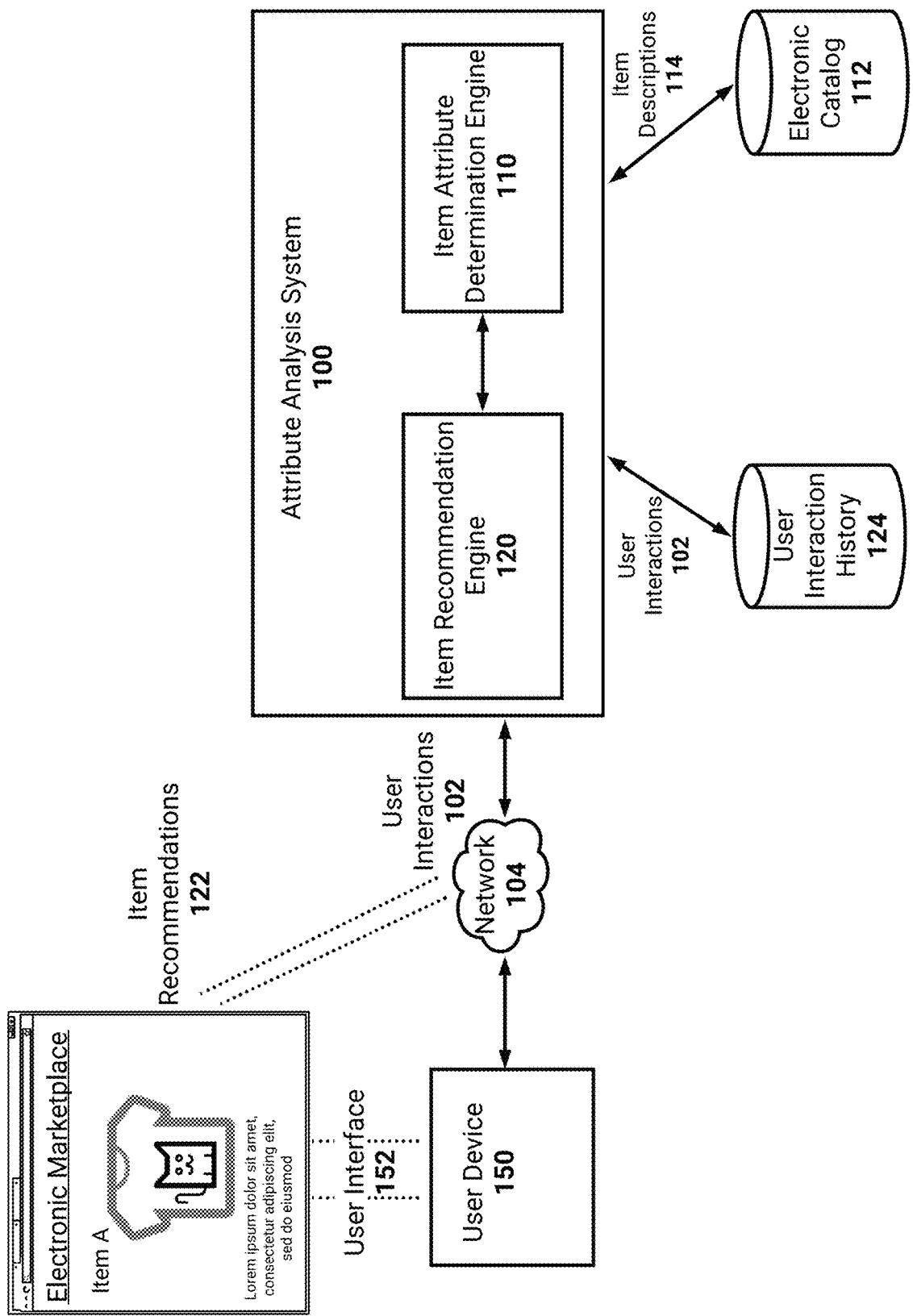
FIG. 1A illustrates a block diagram of an attribute analysis system in communication with a user device.

This specification describes, among other things, techniques to enhance a user experience of using an example electronic catalog. As will be described, a system may use attributes of items to improve upon item recommendations being provided to users of the electronic catalog. An attribute, in this specification, may be interpreted broadly and represent a qualitative or quantitative aspect of an item. Examples may include a color, a material, a size, a manufacturer, and so on. As will be described, the attributes may optionally be extracted from descriptions of items. The system may be, for example, the attribute analysis system 100 described below. The electronic catalog described herein may enable third-party entities to include their items in the electronic catalog. The electronic catalog may also be specific to one entity or seller. Users may access the electronic catalog via a web page or an application, and search for available items. As will be described, the web page or application may present item recommendations. The item recommendations may be determined based on monitoring prior items viewed by the users. For example, the system may determine attributes of items which are expected to be of interest to a user. In this example, the system may then identify items which include these determined attributes. One or more of these identified items may then be recommended to the user.

The electronic catalog described herein may include hundreds of millions, or billions, of items. Third-party entities, such as sellers, may cause their items to be included in the electronic catalog. Thus, users of the electronic catalog may use the catalog as a front-end into an immense listing of items. The items may be organized into a hierarchical structure, such that items may be associated with one or more categories. Examples of a category may include a clothing item, a graphics processing unit, a food stuff, and so on. An entity may, in some embodiments, assign one or more categories to an item the entity is offering. In some embodiments, one or more categories may be assigned to the item based on an analysis of the item.

It may be appreciated that items may be associated with attributes beyond their categorization. For example, an item may be classified in a hot sauce category. However, users of the electronic catalog may understand the item to be associated with more detailed attributes than just 'hot sauce'. Example attributes may include the hot sauce being a vinegar-based sauce, or the hot sauce being used for certain dishes, or the hot sauce's taste being more savory than other hot sauces, and so on. It may be impractical to include sufficient categories in the hierarchy to enable separation of items according to these attributes. Additionally, these attributes may difficult to categorize.

Thus, the electronic catalog may include item descriptions of items. The item descriptions may be provided by third-party entities offering the items and may be written in a natural language form. Users of the electronic catalog may view these item descriptions on landing pages associated with respective items. An example item description of a dress, may include, 'you will love this party dress in flowery pattern.' Another example item description of a dress may include, 'this is a mini flower printed women's dress.' With respect to the hierarchy described above, these dresses may be classified according to a dress category. However, it may be appreciated that users of the electronic catalog may understand these dresses to be associated with additional attributes. For example, users may understand an attribute as reflecting the dresses being in a flower print.

Described herein are techniques for extracting, and then using, these attributes to improve upon item recommendations. As will be described, as a user browses the electronic catalog the user may view items during a browsing session. The system may determine item recommendations based on the attributes of these viewed items. However, it may be difficult to ascertain which of the attributes is important to the user. For example, a user may have viewed sports team hats included in the electronic catalog. These hats may have a substantial number of attributes, such as variations in color, sports team name, material, pattern, size, manufacturer, and so on. In this example, it may therefore be difficult to infer which of the attributes are of interest to the user. Even with techniques to extract attributes of items, it may present a technological challenge to determine accurate item recommendations for the user. Advantageously, and as will be described, the system described herein may determine which of the attributes is a key attribute of interest to the user. The system may then recommend items based on the determined key attributes.

With respect to determining the key attributes, the system may determine attribute relevance scores for respective attributes. As will be described, an attribute relevance score may indicate a degree to which a particular attribute is predicted to be of interest to a user. The attribute relevance score may be based on a measure of frequency and recency associated with an attribute (herein referred to as a measure of 'time-decayed frequency'). For example, attributes associated with items viewed more recently may be understood to be more of interest to a user than other attributes. As another example, attributes which are more frequently associated with viewed items may be understood to be more of interest to a user than other attributes. The attribute relevance score may additionally be based on a measure of importance of an attribute. For example, importance of an attribute may be based on a likelihood associated with how often any item would have the attribute. In this example, it may be understood that attributes which are less common may be assumed to be more important. Thus, if the user routinely views items with an uncommon attribute, then the system may identify the attribute as being important to the user.

With respect to the example of a sports team hat, the system may identify attributes of items which the user has viewed recently and more frequently. For example, the system may identify attributes of hats comprising (1) cotton and (2) a particular sports team name. In this example, the user may have been looking at cotton hats which are associated with the particular sports team. The system may additionally identify attributes which are determined to be the most important to the user. For example, it may be understood that an attribute corresponding to a particular team name may be more important than an attribute corresponding to a type of material. That is, the user may find the particular sports team depicted on the hat to be more important than the material of the hat.

As will be described, the system may determine the importance based on a commonality of an attribute with respect to an attribute class. For example, an attribute class may represent a type of material. In this example, the system may determine that there are two types of material (e.g., cotton, polyester). As another example, an attribute class may represent a sports team. In this example the system may determine that there are a threshold number of sports teams (e.g., 32 football teams). Thus, the system may identify that the particular sports team is more important than the material being cotton based on the respective commonalities.

In this way, the system may therefore determine recommended items based on the attributes of items viewed, selected, purchased, and so on, by the user. As the user searches items in the electronic catalog, the system may update the recommendations based on the attributes of searched items.

While the description herein describes use of user interfaces, it may be appreciated that the techniques may be applied using auditory interfaces. For example, a user may interact with a personal digital assistant. In this example, the user may provide a search query or terms associated with items included in an electronic catalog. Search results may then be described to the user using natural language processing techniques. The user may request information related to specific items included in the search results, and the personal digital assistant may describe these in more detail. These specific items may then be used to determine attributes, and attribute relevance scores may be determined. Item recommendations may then be described to the user via the personal digital assistant.

The attribute relevance scores can be used, in some embodiments, for purposes other than generating item recommendations for the user. For example, U.S. Pat. No. 7,752,077 discloses a process for generating an item comparison in which multiple items are compared in terms of their shared attributes, and in which the attributes are ordered or prioritized for display based on their predicted levels of importance. The attribute relevance scores disclosed herein can be used in the context of the U.S. Pat. No. 7,752,077 patent to rank or prioritize the item attributes for presentation in the item comparison While, as described above, it may be advantageous to utilize such attributes when recommending items, at present there exists a great technological challenge to extracting the attributes. For example, the item descriptions may be written in multitudes of sentences. These sentences may be of varying quality and understandability. Additionally, the sentences may include inaccuracies or typos of words. Furthermore, there may be a plethora of ways in which a same attribute may be written. Thus, at present it may be difficult for attributes to be leveraged.

Therefore, at present electronic catalogs may rely upon recommendation techniques which do not use learned attributes of items. Instead, the recommendations may be based on other techniques such as recommending popular items. Additionally, the recommendations may be based on items which other users viewed. For example, a multitude of users may have viewed a hat depicting a first sports team. The users may have then viewed another hat depicting a second sports team, and then purchased this other hat. Certain recommendation techniques may use this information to identify that for the category of item corresponding to 'hat', users consider these hats to be similar. Thus, a user who views a hat depicting the first sports team may be recommended hats depicting the second sports team. However, the user may have no interest in the second sports team. Since, as described above, it may be impractical to have sufficient categories to cover detailed attributes, these recommendation schemes may produce poor recommendations. In contrast, leveraging the item descriptions themselves may enable much more detailed recommendations to be determined.

As will be described, the system described herein may analyze item descriptions (e.g., raw text) and learn candidate keywords of attributes of the items. For example, a hidden Markov model may be used. Based on the candidate keywords, the system may learn that one or more of the candidate keywords correspond to a same attribute. For example, collaborative filtering techniques may be employed. As another example, deep learning techniques may be employed (e.g., word embedding techniques). The system may then associate items included in the electronic catalog with respective attributes. Thus, the system may learn specific attributes which are associated with items. Since these attributes were learned from raw text, they provide for a great deal of flexibility and detail which may otherwise be lost.

Example Block Diagram

FIG. 1A illustrates a block diagram of an attribute analysis system 100 in communication with a user device 150. The attribute analysis system 100 may be a system of one or more computers, one or more virtual machines executing on a system of one or more computers, and so on. As described herein, the attribute analysis system 100 may determine item recommendations 122 based on analyzing user interactions 102 of users with respect to an electronic catalog 112. In the illustrated example, the electronic catalog 112 is represented as information included in a database or storage system. As described above, the electronic catalog 112 may include information associated with thousands, millions or billions of items. These items may be available via an electronic store, and may be offered by different third-party entities.

The user device 150 may be a mobile device, tablet, wearable device, augmented or virtual reality device, laptop, computing system, and so on. As illustrated, the user device 150 is presenting a user interface 152 associated with the electronic store. The electronic store may enable a user of the user device 150 to view, select, and/or checkout items included in the electronic catalog 112. In some embodiments, the user interface 152 may be rendered via a browser executing on the user device 150. For example, the user device 150 may present a web page associated with the electronic store. The attribute analysis system 100 may, in some embodiments, serve the web page to the user device 150 via a network 104 (e.g., the internet). Optionally, the attribute analysis system 100 may provide information to a front-end web server which serves the web page. In some embodiments, the user interface 152 may be rendered by an application executing on the user device 150. For example, the application may be obtained from an online application store. In this example, the application may receive information from the attribute analysis system 100 for inclusion in the user interface 152.

The attribute analysis system 100 includes an item attribute determination engine 110 which maps one or more attributes to each item included in the electronic catalog 112. As described above, the electronic catalog 112 may include item descriptions 114 for each item. These item descriptions 114 may be generated by third-party entities offering the items, and may be presented via the user interface 152 described herein. Thus, a user of the user interface 152 may view a description of an item prior to selecting the item for checkout. An example description may include a summary of an item, bullet points describing the item, a title of the item, and so on. In some embodiments, a description may represent specified values corresponding to one or more pre-established fields. Example fields may include a size, a function, a material type, ingredient list, processor speed, and so on.

Additionally, each item included in the electronic catalog 112 may be classified according to one or more categories in a hierarchy. For example, an item (e.g., a certain model of a sonic toothbrush) may be classified under a 'personal care' category, a 'toothbrush' category, and a 'sonic toothbrush' category. As another example, an item (e.g., a beanie hat depicting the logo of a sports team) may be classified under a 'men's fashion' category, a 'men's hats' category, and a 'beanie hat' category.

The attribute determination engine 110 may obtain the item descriptions 114 from the electronic catalog 112, and then extract item attributes. The attribute determination engine 110 may extract item attributes for each of a multitude of categories of items. For example, the engine 110 may learn item attributes specific to hats. As another example, the engine 110 may learn item attributes specific to beanie hats. As another example, the engine 110 may learn item attributes specific to formal dresses. Thus, the engine 110 may learn item attributes of categories which are a threshold depth within the hierarchy described herein.

As an example of extracting item attributes, the attribute determination engine 110 may learn candidate keywords included in the item descriptions 114. The candidate keywords may represent candidates of attributes. As will be described, these candidate keywords may then be analyzed, such that similar keywords are mapped to a same attribute. In some embodiments, a hidden Markov model may be used. In these embodiments, portions of text included in an item description may be assigned a probability indicating whether the portion may be characterized as a keyword. The portions may then be assigned as candidate keywords based on respective probabilities. For example, a portion may be assigned as a candidate keyword if its assigned probability exceeds a threshold.

As an example with respect to a dress item, an item description may include, "this is a mini flower printed women's dress." The attribute determination engine 110 may extract portions of the item description text. The engine 110 may then determine that the bigram "flower printed" is to be assigned a higher probability than "printed women's." For example, the engine 110 may determine that the token "printed" appear subsequent to the token "flower" more frequently in the item descriptions 114 than "women's" appears subsequent to "printed." The token, "mini," may additionally be determined to have a higher probability than "mini flower." For example, there may be a limited (e.g., less than a threshold) number of cases in which "mini" and "flower" are included together (e.g., adjacent) in the item descriptions 114. The portion, "this is a," may optionally be ignored. As an example, this portion may be determined to be too common within the item descriptions 114 (e.g., the portion may be included in item descriptions greater than a threshold number of times).

In some embodiments, the attribute determination engine 110 may map item descriptions of each item to respective candidate keywords. As described above, the attribute determination engine 110 may learn candidate keywords included in the item descriptions 114. The attribute determination engine 110 may access the item descriptions associated with a particular category. The engine 110 may then identify which of the candidate keywords are to be associated with each item associated with the particular category. As an example with respect to the dress item described above, the attribute determination engine 110 may map the keywords "mini," "flower printed," and "women' s," to the dress item.

Using the mapped candidate keywords, the attribute determination engine 110 may then map similar keywords to a same common attribute. For example, it may be appreciated that different item descriptions may refer to a same attribute while using different language. With respect to a dress item, the candidates "flower print," "floral," "flowery pattern," and so on, may be mapped to a same common attribute. As an example of mapping similar keywords, collaborative filtering may be used. For example, the attribute determination engine 110 may measure a frequency with which any two items mapped to different candidate keywords have been interacted with by a same set of users. Interacted with, in this specification, may include the users viewing, checking out, and so on, items via the electronic store described herein.

With respect to collaborate filtering, the attribute determination engine 110 may identify a first item mapped to a particular candidate keyword which has been accessed frequently by the same set of users who accessed a second item mapped to a similar candidate keyword. For example, the attribute determination engine 110 may access browsing sessions of users of the electronic catalog 112. Examples of a browsing session are described below. The attribute determination engine 110 may then identify the first item and second item as being included in a same browsing session of greater than a threshold number of users. The attribute determination engine 110 may then use collaborative filtering to associate the candidate keywords to a same attribute.

Optionally, the attribute determination engine 110 may use deep learning techniques to improve upon the collaborative filtering technique described above. For example, the attribute determination engine 110 may generate word embeddings from the candidate keywords. With respect to the example of a dress item, and as an example, collaborative filtering may associate the candidate keywords "flower print" and "short sleeve" based on user behavior. For example, a threshold number of users may have viewed items which are mapped to these candidate keywords. The attribute determination engine 110 may therefore use contextual information learned from word embeddings to identify that these candidate keywords are not associated with a same attribute. An example word embedding may be generated using word2vec, ELMo, GloVe, Universal Sentence Encoder, and so on.

A browsing session, in this specification, may refer to a particular intent of the user with respect to the electronic catalog 112. As an example, a browsing session may initiate upon a user accessing (e.g., logging-into) the electronic store. In this example, the browsing session may end upon the user adding an item to a cart or upon the user not interacting with the electronic store for greater than a threshold amount of time. As another example, a browsing session may terminate upon the user viewing a threshold number of items which are included in a different category than prior items. Thus, if the user initially searched for dresses, but then changed to a different category of item (e.g., televisions), the user's browsing session may be indicated as terminated.

The attribute determination engine 110 may therefore extract attributes from the item descriptions 114 of items. Advantageously, the attribute determination engine 110 may optionally extract attributes associated with respective categories of items. Since different categories of items may use distinct terms, vocabulary, and so on, the attribute determination engine 110 may ensure that the extracted attributes are contextually relevant for a particular category of items. The attribute analysis system 100 may store information associating attributes with respective items. As will be described, the attributes may be used to generate item recommendations 122 for users. For example, the attribute analysis system 100 may learn a user's preferences at an attribute level. Thus, the item recommendations 122 may be highly targeted to correspond with the user's preferred attributes.

FIG. 1 illustrates the user device 150 presenting a user interface 152 associated with the electronic store described above. A user of the user interface 152 may therefore interact with the electronic store. For example, the user may provide requests or queries associated with searching items, and the electronic store may present responsive items via the user interface 152. The attribute analysis system 100 may thus receive these user interactions 102. The user interactions 102 may represent real-time interactions with items included in the electronic catalog 112. For example, a user interaction may include a user view an item (e.g., via a landing page). As another example, a user interaction may include a user viewing search results associated with a search term or query. These user interactions 102 may be used by the attribute analysis system 100 to determine item recommendations 122.

Furthermore, the attribute analysis system 100 may store the received user interactions 102 in a user interaction history database 124. The database 124 may be used by the attribute analysis system 100 to determine trend information associated with item recommendations 122. For example, the attribute analysis system 100 may learn that for a certain category of items, such as shoes, the user historically prefers certain attributes of shoes.

The attribute analysis system 100 includes an item recommendation engine 120. The item recommendation engine 120 may learn attributes for which the user has indicated a preference. For example, the user may initiate a browsing session on the electronic store. The item recommendation engine 120 may identify a category of items being searched by the user. As an example, the item recommendation engine 120 may identify that the user is searching for hats. As the user views different hats, the item recommendation engine 120 may learn the attributes of hats which the user prefers. As will be described, the item recommendation engine 120 may then recommend hats which include one or more of these learned attributes.

To generate item recommendations 122, the item recommendation engine 120 may obtain identifications of the items included in the user's browsing session. In some embodiments, the item recommendation engine 120 may access one or more prior browsing sessions of the user. For example, the prior browsing sessions may be related to the user searching for items of a same, or similar, category as a current browsing session. The item recommendation engine 120 may then obtain attributes associated with the obtained items. As described above, the item attribute determination engine 110 may map common attributes to items.

As described below, in some embodiments the item recommendation engine 210 may determine a relevancy of each attribute. For example, an attribute relevancy score may be determined. In some embodiments, a user may specify the attributes of interest to the user. For example, as the user browses for items via a user interface, the user interface may present example attributes associated with one or more categories of items. The user may then select certain attributes of interest to the user. These attributes may then be used to determine item recommendations. The user may also specify (e.g., using a verbal or textual input) the attributes of interest to the user.

The item recommendation engine 120 may determine a measure of recency and frequency (herein referred to as 'time-decayed frequency') associated with each of the obtained attributes. For example, a measure of time-decayed frequency may identify a total number of times which the user has interacted with any item with a particular attribute. Each occurrence of the particular attribute may then be discounted using a time decay function so that the older events contribute smaller amounts. In this way, the item recommendation engine 120 may identify attributes which are of greatest interest to the user.

As an example, the attributes with a greatest time-decayed frequency measure may be attributes for which the user is most recently interested in. Thus, as the user provides additional user interactions 102 and searches the electronic catalog 112, the item recommendation engine 120 may rapidly incorporate the new information. For example, the item recommendation engine 120 may identify that different attributes are of the most recent interest by the user. Further description, and examples, of determining time-decayed frequency will be described below with respect to FIG. 3.

With respect to the above-described example of a hat, the user may have interacted with three hats (1) which were all green, (2) which depicted a logo of a particular sports team, and (3) which were made of cotton. Thus, the attributes (1) green, (2) particular sports team, and (3) cotton, may all be assigned equal measures of time-decayed frequency. The item recommendation engine 120 may therefore advantageously have information identifying attributes of hats in which the user is interested. However, it may be appreciated that the user's intention for searching for hats may be based on a subset of these attributes. For example, the user may be most interested in green hats which depict the particular sports team's logo. Advantageously, the item recommendation engine 120 may determine respective measures of importance associated with the obtained attributes.

To determine a measure of importance of an attribute, the item recommendation engine 120 may identify how common the attribute is. For example, the item recommendation engine 120 may identify how common an attribute is with respect to a category of items being viewed by the user. Thus, it may be appreciated that a first attribute (e.g., cotton) may be more common than a second attribute (e.g., the particular sports team). In this example, the item recommendation engine 120 may identify that the measure of importance associated with the particular sports team is to be greater than that of cotton.

In some embodiments, the item recommendation engine 120 may identify a cardinality associated with each attribute. For example, the cardinality may identify a number of attribute values within a particular attribute class. With respect to the particular sports team attribute, the item recommendation engine 120 may identify a total number of sports teams within a same sport. For example, if the particular sports team is a National Football League (NFL) team, then the cardinality may be a total number of NFL teams (e.g., 32). With respect to the cotton attribute, the item recommendation engine 120 may identify a total number of hat materials. In this example, the cardinality may be two and include material options cotton and polyester. As will be described in more detail below, with respect to FIG. 3, the cardinality may be learned based on example techniques, such as crowd sourcing, machine learning, and/or clustering techniques.

Based on cardinalities, the item recommendation engine 120 may determine the measure of importance of each attribute. As an example, the item recommendation engine 120 may identify that the particular sports team is an important attribute. Indeed, if the user randomly clicked on hats then it may be appreciated that it is less likely the hats would depict the particular sport team's logo. In some embodiments, the item recommendation engine 120 may determine the measure of importance of an attribute as being based on one or more of (1) the cardinality of the class of attribute, (2) a number of items in a same category of items which are associated with the attribute, and (3) a number of items in the same category of items which are associated with an attribute of the same class of attribute.

Thus, the measure of importance may be determined based on the cardinality of the class of attribute. The measure of importance may further be based on a rarity of the attribute with respect to the category of items. For example, and with respect to hats, the engine 120 may identify a number, or percentage, of hats which depict the particular sport team's logo. The measure of importance may further be based on a rarity of the class of attribute being associated with the category of items. For example, and with respect to hats, the engine 120 may identify a number, or frequency, of hats which depict any sport team's logo. Additional description related to determining a measure of importance is included in FIG. 3 below.

The item recommendation engine 120 may determine an attribute relevance score for each of the obtained attributes. For example, the attribute relevance score may be based on the measure of time-decayed frequency and measure of importance for the attribute. The item recommendation engine 120 may then organize the attributes according to attribute relevance score. For example, and with respect to hats, the item recommendation engine 120 may determine that the particular sports team attribute has a highest attribute relevance score. As another example, the item recommendation engine 120 may determine that the green color attribute has a next highest attribute relevance score. A threshold number of the attributes with highest attribute relevance scores may be assigned as key attributes.

Figure 2A:
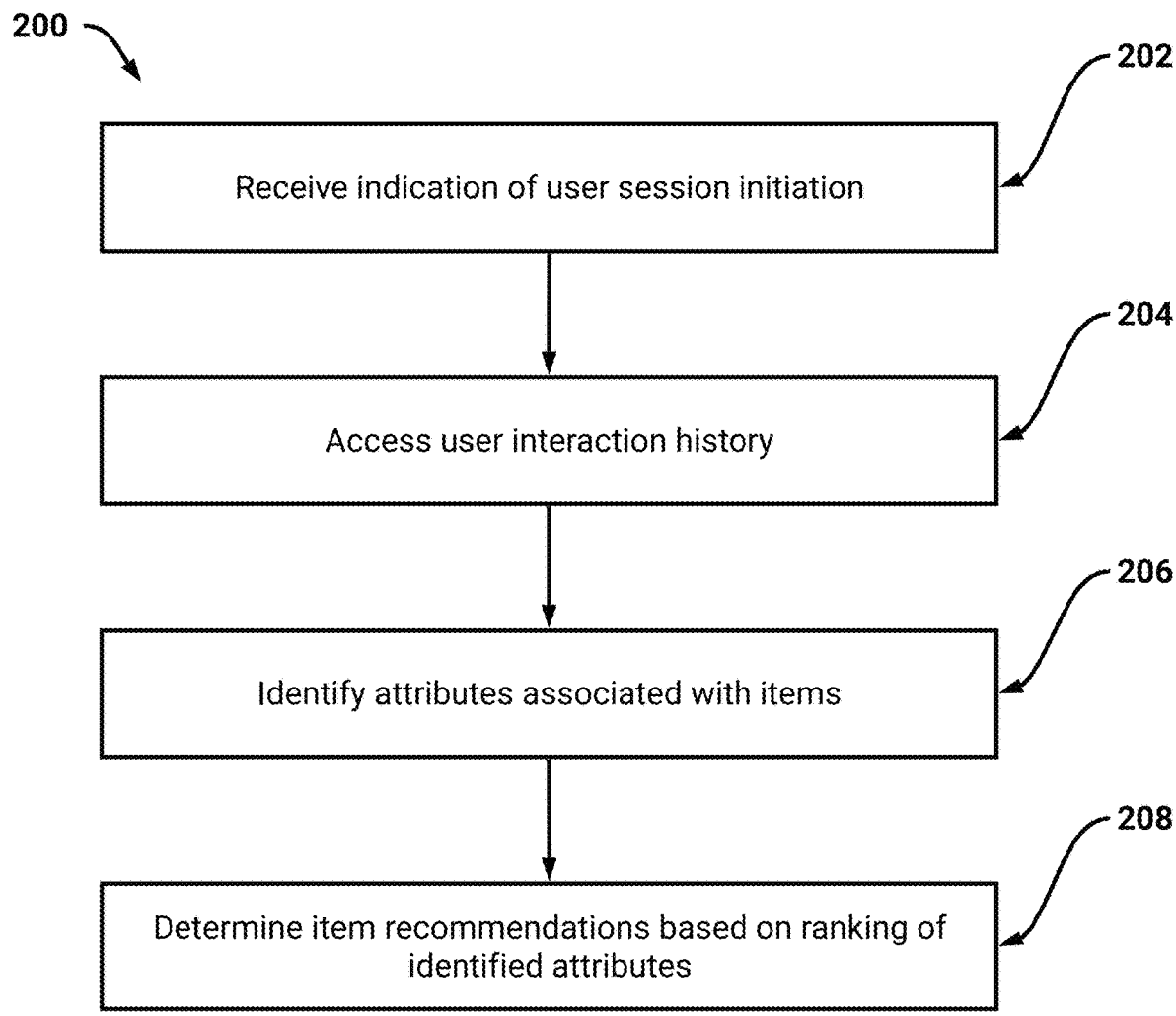
FIG. 2A is a flowchart of an example process for determining item recommendations.

The item recommendation engine 120 may then generate item recommendations 122 based on the attribute relevance scores. For example, an attribute with a greatest attribute relevance score may be selected. The item recommendation engine 120 may then identify items in the electronic catalog 112 which are associated with this selected attribute. The identified items may be included in a same category of items with which the user is interacting. The item recommendation engine 120 may then select one or more additional attributes based on respective attribute relevance scores. The item recommendations 122 may include items which are associated with these selected attributes. Additional description related to generating item recommendations 122 is included below, with respect to FIG. 2A.

As the user interacts with the electronic store, the attribute analysis system 100 may update the attribute relevance scores. For example, and with respect to the example of hats above, the user may start viewing blue hats. In response, the item recommendation engine 120 may update the attribute relevance score associate with the attribute blue. For example, the measure of time-decayed frequency for the blue attribute may be increased while the measure for green may be decreased. Based on this updated attribute relevance score, the attribute analysis system 100 may include one or more blue hats in the item recommendations 122. Thus, the user interface 152 may, in substantially real-time, present updated item recommendations 122 based on current (e.g., fresh) user interactions 102 from the user. Using learned attributes to recommend items may thus provide for enhanced recommendation accuracy and relevancy. Additionally, the techniques may respond very rapidly such that users may receive accurate recommendations during a same browsing session.

Figure 1B:
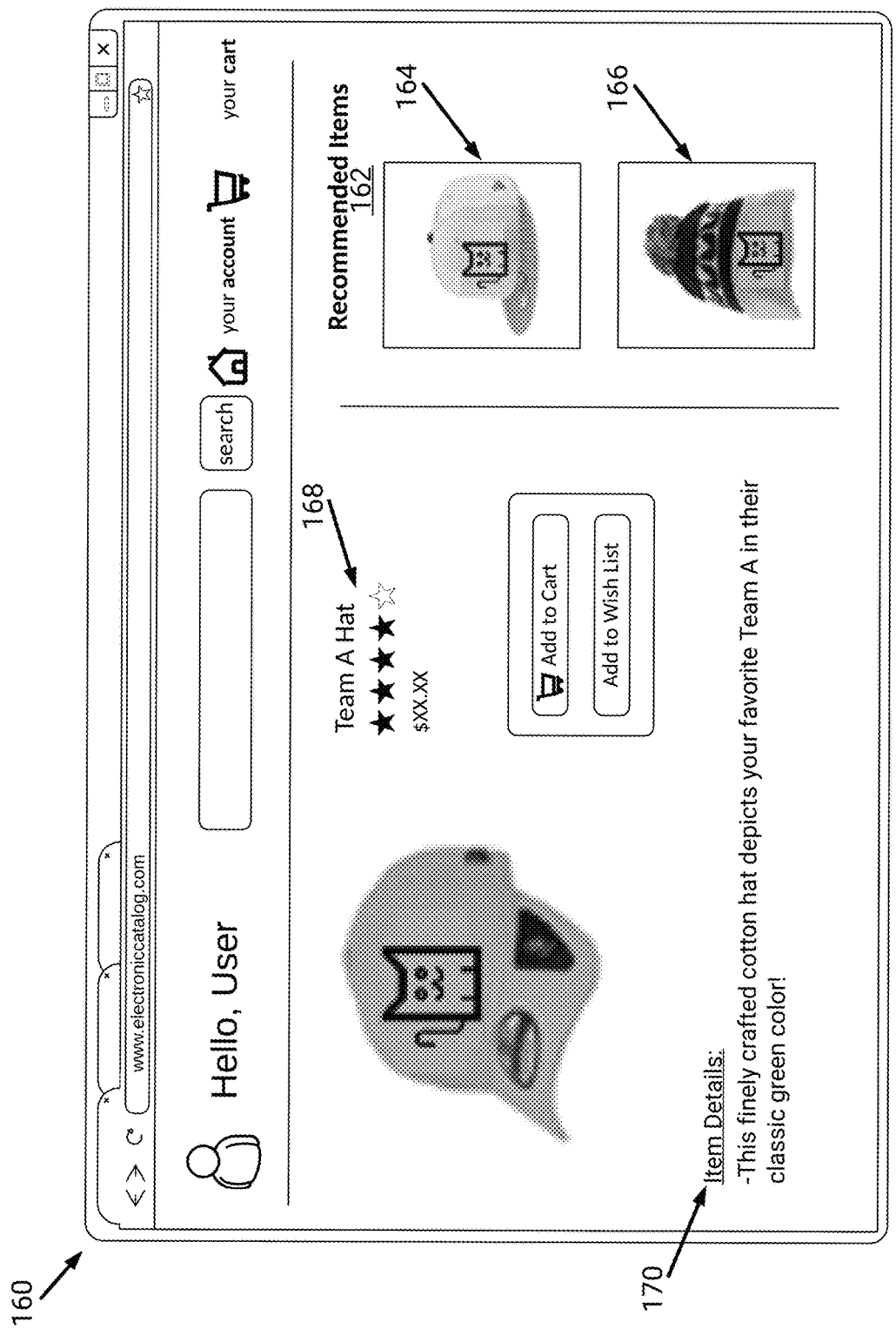
FIG. 1B is an example user interface illustrating recommended items according to the techniques described herein.

FIG. 1B is an example user interface 160 illustrating recommended items 162 according to the techniques described herein. The example user interface 160 may represent an embodiment of the user interface 152 in which the user is searching the electronic catalog 112 for hats. For example, the user may optionally provide a search query or request to find hats. As another example, the user may select which are commonly viewed, or selected for checkout, by other users.

In the illustrated example, the user is viewing a particular hat 168 associated with an item description 170. As described above, the attribute analysis system 100 may associate attributes with respective items. In this example, the attribute analysis system 100 may associate the attributes, (1) cotton, (2) Team A, and (3) green, with the particular hat 168. These attributes may have been extracted from the item description 170. The recommended items 162 may therefore be determined by the attribute analysis system 100 based, at least, on these attributes. The attribute analysis system 100 may further determine the recommended items 162 based on prior items viewed by the user. For example, the user may have viewed one or more prior hats, or other clothing items, in a same, or recent, browsing session.

FIG. 1B illustrates example recommended items 162. For example, a first recommended item 164 depicts a same logo of Team A as the particular hat 168. In this example, the attribute analysis system 100 may have determined that the attribute with a greatest attribute relevance score is the Team A attribute. This first recommended item 164 may optionally be a same color and/or may be made of a same material. Similarly, a second recommended item 166 depicts the same logo of Team A. This second recommended item 166 is a different style (e.g., a beanie). Thus, the attribute analysis system 100 may have determined that the style attribute of beanie has a lower attribute relevance score than the Team A attribute.

Example Flowcharts

FIG. 2 is a flowchart of an example process 200 for determining item recommendations. For convenience, the process 200 will be described as being performed by a system of one or more computers (e.g., the attribute analysis system 100).

At block 202, the system receives information identifying initiation of a user browsing session. As described above, a browsing session may identify a start of a user searching for items, services, and so on, which are available via an electronic catalog.

At block 204, the system accesses the user's interaction history. The system may monitor the items being viewed, selected, shared, and so on, by the user. For example, as the user browses for shoes, the system may monitor the specific shoes viewed by the user.

At block 206, the system identifies attributes associated with items included in the user's interaction history. As described in FIG. 1A, the system may associate attributes with items included in the electronic catalog. Thus, the system may obtain the attributes associated with the items included in the user's interaction history. The attributes may be specific to a category of items. For example, the attributes may be specific to shoes. As another example, the attributes may be specific to hats. The attributes may also be specific to a multitude of categories of items. For example, the attributes may be specific to clothes and sub-categories thereof (e.g., shoes, shirts, pants, and so on).

In some embodiments, the system may determine measures of similarity between attributes determined for categories of items. Based on attributes being similar between two or more categories, the system may optionally enable the attributes to be shared amongst the categories. For example, the system may determine that attributes for the category of televisions may be similar to the attributes for the category of computer displays. Thus, the attributes may be shared between televisions and computer displays.

At block 208, the system determines item recommendations based on a ranking of the identified attributes. As described above, the system may determine attribute relevance scores for the identified attributes. For example, an attribute relevance score associated with an attribute may be based on a measure of time-decayed frequency and a measure of importance of the attribute. Additional description related to determining an attribute relevance score is included below, with respect to FIG. 3.

The system may rank the attributes according to respective attribute relevance score. As an example with respect to hats, the attributes may include green, a particular sports team, and cotton. The system may thus organize these attributes as follows according to respective attribute relevance score: (1) particular sports team, (2) green, and (3) cotton.

Figure 2B:
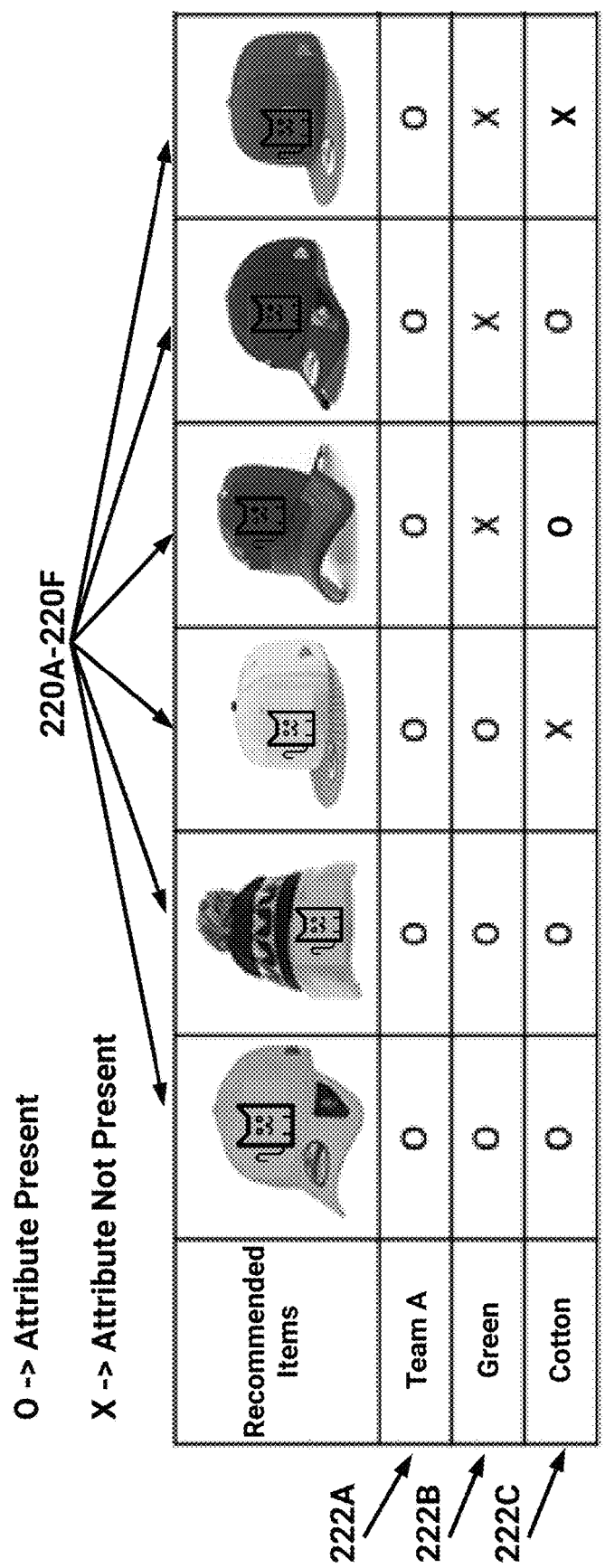
FIG. 2B is an example of recommended items and corresponding attributes.

Reference will now be made to FIG. 2B, which illustrates an example of recommended items and corresponding attributes. In the example, recommended items 220A-220F are illustrated along with corresponding attributes 222A-222C of the items. For example, the recommended items 220A-220F may be hats, and the corresponding attributes 222A-222C may be attributes of hats which were obtained from the user's browsing session.

The system may access the electronic catalog, and identify items associated with a same category of items. For example, the system may identify hat items. The system may then identify items which are associated with the particular sports team. Thus, the identified items may represent a pool of hats which are associated with the particular sports team. As illustrated in FIG. 2B, the recommended items 220A-220F each depict a logo of the particular sports team (e.g., 'Team A').

In some embodiments, the system may then determine item recommendations from this pool of items. For example, the system may identify that the green attribute has a next highest attribute relevance score. The system may thus identify hats which depict the particular sports team and which are green. As illustrated in FIG. 2B, recommended items 220A-220C are green hats which depict the logo of the particular sports team. Thus, the system may reduce a size of the pool of items to include hats with these two attributes. Similarly, the system may then identify items from this pool of items which are made of cotton. As illustrated in FIG. 2B, recommended items 220A-220B are associated with the three obtained features.

In this way, the system may select an attribute associated with a highest attribute relevance score. The system may then filter items (e.g., items of a same category of items the user is searching) to retain items associated with the selected attribute. The system may then filter these items to retain items associated with a next highest attribute. The system may then filter these items to retain items associated with a next highest attribute. This process may be repeated until the system exhausts the attributes. In some embodiments, the system may discard attributes which are associated with an attribute recommendations core below a threshold. In some embodiments, the system may limit an extent to which items are filtered. For example, the system may identify items which are associated with a top threshold number of attributes (e.g., 3 attributes, 4 attributes, and so on).

The system may thus assign items associated with a greatest number of the attributes as being ranked higher than other items. The items may be presented to the user via a user interface being used by the user. Optionally, a threshold number of the items may be presented as the recommended items. For example, the top 2, 3, 5, and so on, items according to the ranking may be recommended. In some embodiments, the threshold number may be based on a screen size of a display of a user device used by the user.

Additionally, it may be appreciated that there may be a multitude of items which are associated with the attributes 222A-222C illustrated in FIG. 2B. For example, different models of hats may each depict the logo of Team A, be green, and be made of cotton. Thus, the system may use user-rating information to select from among the models. For example, the system may access information identifying a number of stars, or a numerical value, assigned by users as rating information. As another example, the system may analyze comments or reviews left by users. In this way, the system may select highest-rated items to be recommended to the user.

In some embodiments, the system may obtain an initial ranking of item recommendations. The initial ranking may then be modified based on attribute relevance scores as described herein. For example, the user may provide a search query. In this example, the search query may relate to items or services associated with the electronic catalog. The system may obtain, or determine, items responsive to the search query. These items may then be ranked, for example according to popularity, the user-preference information, and so on. Attributes associated with the ranked items may then be identified. For example, the attributes associated with a top threshold number of the items may be identified. Attribute relevance scores may then be determined for the attributes. The items may then be re-ranked based on the attribute relevance scores. As an example, the system may increase rankings of items with greater numbers of attributes having the greatest attribute relevance scores.

In some embodiments, the attribute relevance scores may be used to provide boosts to items in the initial ranking. For example, a particular item may have a particular position in the initial ranking. The system may determine attribute relevance scores as described herein. The system may then rank attributes based on the attribute relevance scores. In this example, the system may identify that the particular item has a highest ranked attribute. The system may then provide a boost to the particular item, such that it may be positioned higher in the ranking than other items which do not have the highest ranked attribute.

Figure 3:
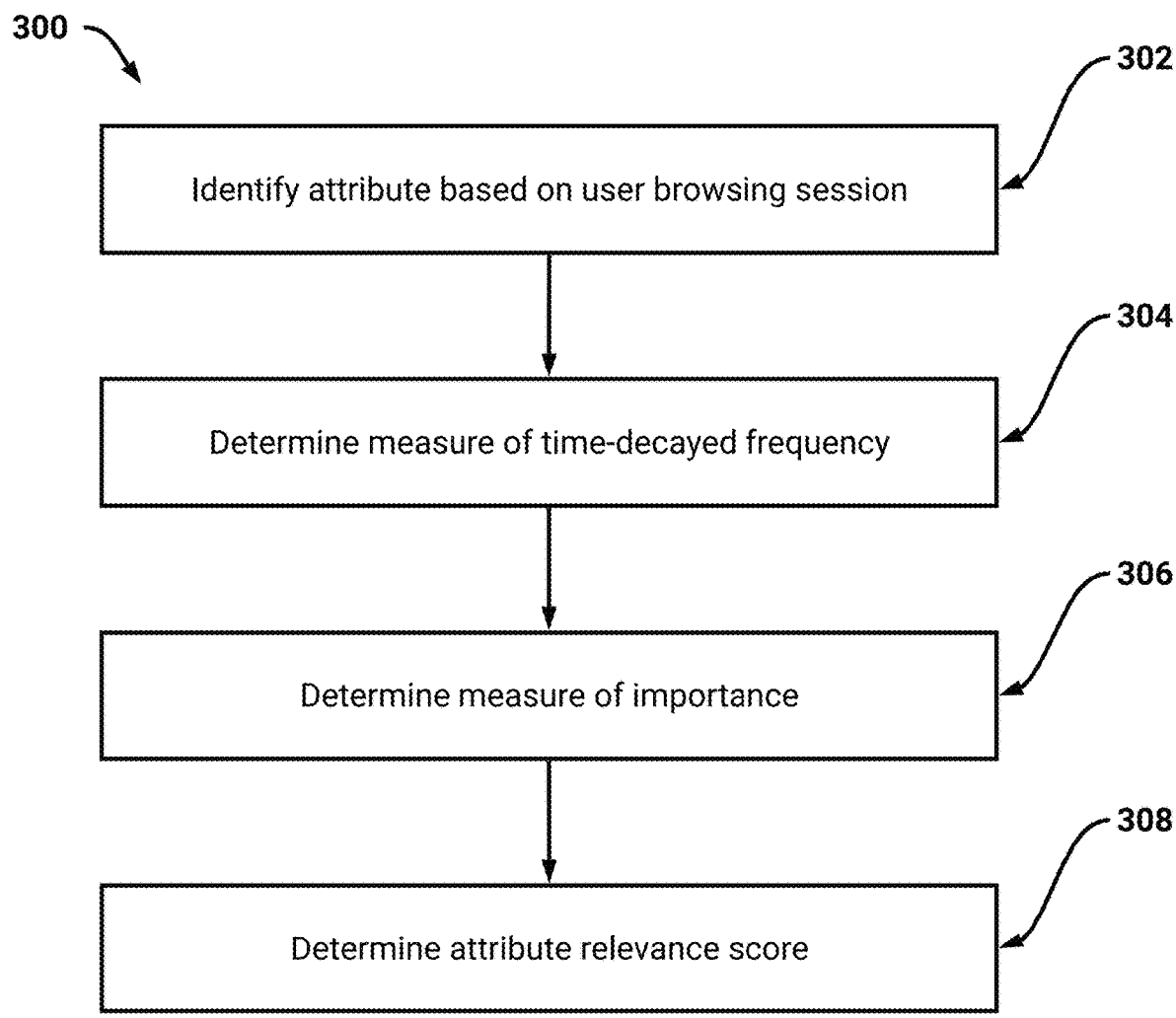
FIG. 3 is a flowchart of an example process for determining an attribute relevance score.

FIG. 3 is a flowchart of an example process 300 for determining an attribute relevance score of an item. For convenience, the process 300 will be described as being performed by a system of one or more computers (e.g., the attribute analysis system 100).

At block 302, the system identifies an attribute based on a user browsing session. As described above, the attribute may be associated with one or more of the items included in the user browsing session. For example, the items may be included in an electronic catalog and information associated with the items may be accessible via an electronic store.

At block 304, the system determines a measure of time-decayed frequency. As described in FIG. 1A, the system determines a measure of recency and frequency associated with the attribute. In some embodiments, the system may compute:

$$TimeDecayedFreq(attr_i) = \sum_j Decay(|Now - EventTimeStamp(j)|) = \sum_j \lambda \frac{|NOW - EventTimeStamp(j)|}{UnitTime}$$

In the above example, $attr_i$ may represent the identified attribute. The system may determine a difference between a current time and times at which items associated with the object were interacted with. Optionally, instead of time the system may determine the difference based on an order in which items were viewed. For example, the user may have viewed 10 items in a current user browsing session. In this example, items associated with the attribute may have been viewed as the first item and the third item. Thus, the system may determine the difference based on the number of intervening items between a current item and the item associated with the attribute. It may be appreciated that as the user browses the electronic catalog, if the user ceases viewing items associated with an attribute then the system may identify a reduced interest in the attribute.

In some embodiments, $\lambda$ may be a value less than one. In some embodiments, $\lambda$ may represent a function learned by the system. For example, the system may analyze past historical information. Example historical information may include which items were recommended to users and which of the recommended items led to purchases by the users. The system may adjust $\lambda$ and then determine an effect of the adjustment with respect to an efficacy of the recommended items. In this way, the system may select $\lambda$ to cause a greatest purchasing of recommended items.

At block 306, the system determines a measure of importance of the attribute. As described in FIG. 1A, different attributes maybe more, or less, important to the user. In some embodiments, the system may compute:

$$\text{Importance}(attr_i) = 1 - \log\left(\frac{N_{class}(attr_i)}{|Class(attr_i)|} - IDF(attr_i)\right).$$

In the above example, the importance of the attribute $attr_i$ may be determined. $|Class(attr_i)|$ may represent a cardinality associated with the attribute. For example, a number of variations of a class of the attribute may be identified. As described in FIG. 1A, an example class of attribute may be NFL teams and the cardinality may be 32. To identify the cardinality, crowd-sourcing may be used. For example, the system may identify items viewed by other users which are in a same category of items. The system may then identify variations within the class of attribute. As an example, there may be thousands or more sizes of clothes. For example, sizing may vary according to type of clothes, country of origin, and so on. However, it may be appreciated that for t-shirts there may be a limited number of sizes (e.g., small, medium, large, and so on). Thus, while specific chest sizes (e.g., size 52, 44, and so on) may be used for clothes (e.g., suits), this sizing may not be applicable to t-shirts. The system may therefore identify the items viewed by other users which are t-shirts. The system may thus determine that for t-shirts the cardinality is a particular number (e.g., 4, 5, and so on).

In some embodiments, the system may use machine learning techniques. For example, a topic model may be trained to recognize variations within a class of attribute. As another example, a clustering technique may be employed. For example, a k-nearest neighbor (KNN) technique may be used to cluster attributes into respective classes of attributes. Thus, the system may cluster sizes of t-shirts, as identified based on user browsing sessions, into a same class of attribute.

$N_{class}$ may represent a number of times the attribute class appears in a group of similar items (e.g., the group may be identified using k-nearest neighbors techniques). For example, an example attribute class may relate to a material. In this example, the system may identify a number of items which have a material attribute in a group of similar items. As another example, if there are two green items and two blue items in a group of ten items, then $N_{class}(\text{green})$ or $N_{class}(\text{blue})$ is equal to four. In this example, the system may identify the number of occurrences in which the color attributes appear in the group of ten items. In some embodiments, the group may be identified as a category of items being searched by the user. In some embodiments, the group may be identified based on items which other users viewed. For example, the system may monitor user browsing sessions of a multitude of users. In this example, the system may identify that users commonly (e.g., greater than a threshold measure) viewed certain items subsequent to viewing one or more of the items included in the user's browsing session. As an example, if the user is searching for hats, then the system may identify hats which other users viewed subsequent, or prior, to viewing one or more hats the user also viewed. The system may optionally constrain a size of the group. For example, the system may identify a threshold number of most frequently viewed items similar to the items in the user's browsing session (e.g., 10, 20, and so on).

$IDF(attr_i)$ may represent the inverse document frequency associated with the attribute. In some embodiments, this may represent a measure of how rare the attribute appears within the group described above. For example, the system may compute $IDF(attr_i)$ as $$\log\left(\frac{1}{N_{attr_i}}\right)$$

In the above example, $N_{attr_i}$ may represent a number of items included in the group which are associated with the attribute.

At block 308, the system determines an attribute relevance score. The system may combine the measure of time-decayed frequency and measure of importance. For example the measures may be linearly combined as follows $$\text{Score}(attr_i) = \text{Importance}(attr_i) \cdot \text{TimeDecayedFreq}(attr_i)$$

In some embodiments, the measures may be separately weighted, or the measures may be non-linearly combined. For example, the measure of importance may be weighted higher than the measure of time-decayed frequency. In some embodiments, the measures may be provided to a machine learning model which may generate an output value corresponding to the attribute relevance score.

FIG. 4A is another example user interface 400 illustrating recommended items according to the techniques described herein. The user interface 400 may be similar to the user interface 160 described in FIG. 1B. For example, the user interface 400 may be reached upon a user selecting a user interface element associated with presenting item recommendations. As illustrated, the user interface 400 includes three recommended items 402-406.

In some embodiments, the user interface 400 may include recommended items which are associated with a threshold number of the top attributes according to respective attribute relevance scores. For example, the user interface 400 may ensure that the recommended items are associated with at least 2, or 3, or 5, of the top attributes. In some embodiments, the user of the user interface 400 may specify the threshold number.

The user interface 400 further includes information identifying reasons 408 for which recommended item 402 was included. The reasons 408 may identify attributes associated with the greatest attribute relevance scores. Advantageously, since the recommended items 402-406 are recommended based on specific attributes, the user interface 400 may succinctly explain reasons for the recommendations. In contrast, other recommendation techniques may rely upon less easily digestible reasons for recommendations. In some embodiments, the user interface 400 may respond to user input directed to one of the attributes included in the reasons 408. The user may indicate whether the attribute is to be discarded, such that the attribute is not of interest to the user. The user may also indicate that the attribute is important to the user, and in some embodiments the attribute analysis system 100 may increase an associated attribute relevance score.

Figure 4B:
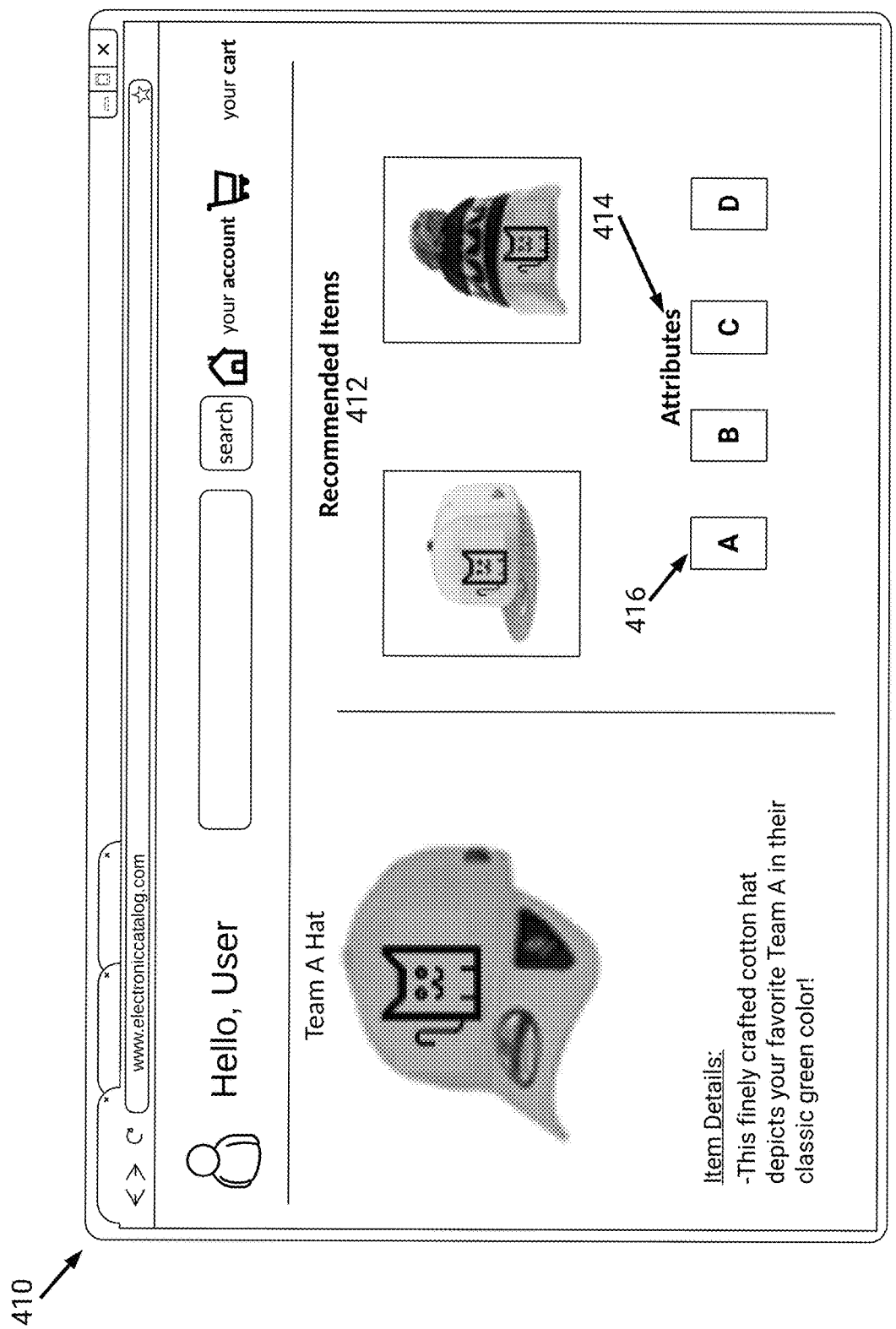
FIG. 4B is another example user interface illustrating recommended items according to the techniques described herein.

FIG. 4B is another example user interface 410 illustrating recommended items according to the techniques described herein. In the example of FIG. 4B, the user interface 410 includes recommended items 412 for a user of the user interface 410. Proximate to the recommended items 412, attributes 414 are identified. These attributes 414 may represent attributes determined to have highest attribute relevance scores as described herein. These attributes 414 may additionally represent attributes for the category of item which have highest attribute relevance scores for a multitude of users. For example, the attributes 414 may be determined to be popular, or most relevant, for the users. The users may represent users of an electronic catalog, or may be users similar to the user of the user interface 410. Similarity may be determined based on browsing habits, user preferences, purchase histories, and/or clustering techniques (e.g., k-means clustering).

The user interface 410 may respond to user input provided to one or more of the attributes 414. For example, the user may select Attribute A 416. This attribute may, for example, a particular material of a hat (e.g., leather). The attribute analysis system 100 may then, in some embodiments, increase an attribute relevance score associated with Attribute A 416. Additionally, upon selection the user recommended items 412 may update to only include items with Attribute A 416. Thus, if the recommended items 412 includes hats with a particular sports team which are either cotton or leather, the recommended items 412 may be updated to only include leather.

Example Computing Environment

Figure 5:
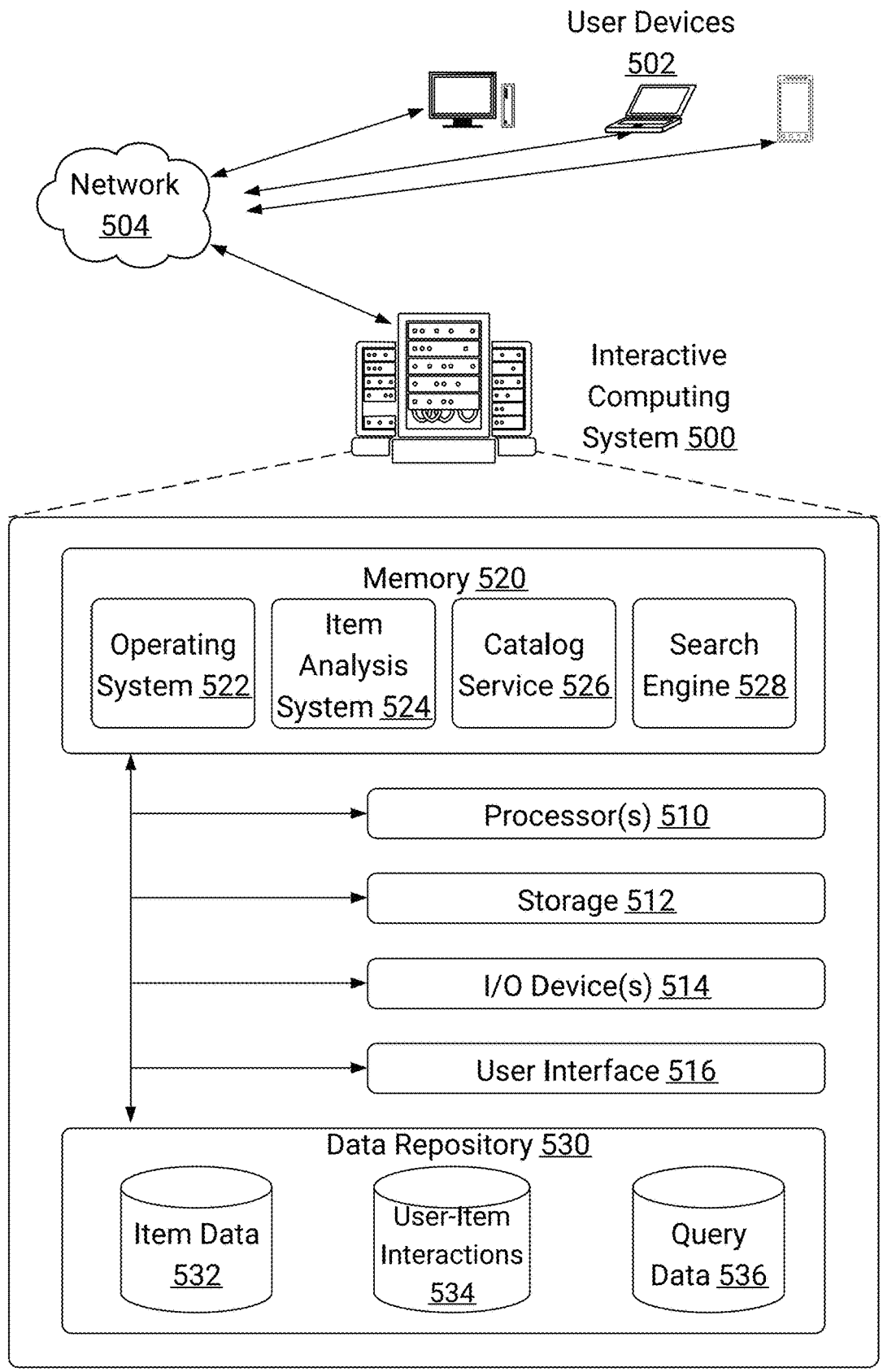
FIG. 5 is a block diagram of an illustrative interactive computing system configured to implement the attribute-based item recommendations described herein.

FIG. 5 is a block diagram of an illustrative interactive computing system 500 configured to implement the attribute-based item recommendations described above with respect to FIGS. 1-4B. The architecture of the interactive computing system 500 may include a memory 520 in communication with a processor 510, which can be in direct communication with one another or distributed among computing devices within a networked computing system and in communication with each other. Components used for the architecture may depend at least in part upon the type of network and/or environment selected.

As depicted interactive computing system 500 may include one or more computers, perhaps arranged in a cluster of servers or as a server farm. The memory and processors that make up these computers may be located within one computer or distributed throughout many computers (including computers that are remote from one another) as detailed herein. These servers may be configured to monitor user browsing sessions and generate item recommendations based on attributes of items included in an electronic catalog. For example, the interactive computing system 500 may be configured to manage user interfaces displayed in connection with an electronic store.

The interactive computing system 500 may include at least one memory 520 and one or more processing units (or processor(s)) 510. The memory 520 may include more than one memory and may be distributed throughout the interactive computing system 500. The memory 520 may store program instructions that are loadable and executable on the processor(s) 510 as well as data generated during the execution of these programs. Depending on the configuration and type of memory, the memory 520 may be volatile (such as RAM and/or non-volatile (such as read-only memory ("ROM"), flash memory, or other memory). In some examples, the memory 520 may include multiple different types of memory, such as static random access memory ("SRAM"), dynamic random access memory ("DRAM"), or ROM.

The memory can store the program instructions as a number of modules that configure processor(s) 510 to perform the various functions described herein, for example operating system 522, machine learning system 524, catalog service 526, and search engine 528. The memory 520 may include operating system 522 for interacting with the interactive computing system 500.

The item analysis system 524 can associate attributes with items included in an electronic catalog. The item analysis system 524 can further determine recommended items for users. For example, one example technique is described above with respect to FIGS. 2 and 3A. In this example technique, the item analysis system 524 can determine attribute relevance scores associated with attributes. The item analysis system 524 can then identify items to recommend based on the attribute relevance scores.

Users can browse an electronic catalog provided by the catalog service 526 or query the search engine 528 to obtain information about electronic catalog content stored in an item data repository 532. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes (referred to herein as "catalog fields") in a hierarchy (or graph). The disclosed attributes associated with search queries can be these catalog fields. The catalog service 526 can provide functionality for users to browse the item hierarchy in addition to searching the catalog. Users can select an item represented in the hierarchy or in a list of search results to see more details about an item. In response to a user item selection, the interactive computing system 500 can provide to a user system 502 a catalog page (sometimes called an item detail page) that includes details about the selected item.

The search engine 528 allows users to search for items of the catalog service 526. In one example, the search engine 528 can use natural language processing techniques such as semantic search to identify the intent reflected in the search query 105. Semantic search seeks to improve search accuracy by understanding the searcher's intent and the contextual meaning of search query terms as they appear in the searchable dataspace, for example within the context of the electronic catalog, to generate more relevant results. Rather than merely identifying keywords within a search query, semantic search systems consider various information about a query including its context (e.g., where on a website is the search made, what was displayed prior to the search, what other searches came before the search), synonyms and meanings of search terms, auto corrections for typographical errors, to provide relevant search results. In order to understand what a user is searching for when a term is ambiguous, meaning that it can have several meanings semantic search techniques can implement word sense disambiguation to identify the most probable meaning from all possible meanings. Thus, semantic search is a data searching technique in a which a search query aims to not only find keywords, but to determine the intent and contextual meaning of the words a person is using for search.

The processor 510 may include one or more general purpose computers, dedicated microprocessors, graphics processors, or other processing devices capable of communicating electronic information and/or training complex machine learning models. Examples of the processor 510 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. Some embodiments can use one or more graphical processing units ("GPUs") or machine-learning-optimized processors as processor(s) 510 for training and/or implementation of the disclosed machine learning models. For example, the described neural network training can require heavy computation for metrics multiplication, and a GPU or similar processor having thousands of cores capable of parallel computing can be capable of performing daily training of a neural network, for example using a massive user-item interaction database as described herein. The processor 510 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 520 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be provided over the network 504 to user devices 502 and used by a user to access portions of the interactive computing system 500. In some examples, the user interface 516 may include a graphical user interface, web-based applications, programmatic interfaces such as application programming interfaces ("APIs"), or other user interface configurations.

The interactive computing system 500 may also include a data store 530. In some examples, the data store 530 may include one or more data stores, databases, data structures, or the like for storing and/or retaining information associated with the interactive computing system 500. Thus, the data store 530 may include data structures, such as an item data repository 532, user interaction data repository 534, and query data repository 536.

The item data repository 532 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 532 also stores data representing item attributes. Item attributes represent characteristics of these items, for example category (or another node in the item hierarchy), brand, gender (e.g., whether the item is typically considered as suitable by males, females, or gender-neutral), target age-range (e.g., baby, child, adult), price, keywords, user ratings, delivery timeframe, product origin, and other item attributes presented herein, to name a few non-limiting examples.

The catalog service 526 can access electronic catalog or other item data from item data repository 532. The items can be associated with one or more nodes in a hierarchical catalog structure, with a general "items" (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category (e.g., is connected by an edge to a broader category node), which is in turn part of a broader category still, and so on, up and until the root node. While the terms "browse node," "browse category," and "category" are often used interchangeably herein, it should be understood that categories can be arranged in a flat structure instead of a hierarchical structure in some embodiments.

The user interaction data repository 534 comprises one or more physical data storage devices that stores logged user behaviors with respect to representations of items within a network environment ("item interactions" or "user interactions") together with time data for the events. Interactions can also include user selection of catalog browse nodes and/or search refinement options, and item attribute value selections/inputs. The time data for the events can be a timestamp or other suitable date/time indicator, and can be used to generate user interaction timelines. Each of the user interactions and associated time data may be stored in, and maintained by, the user interaction data repository 534 with respect to a timeline for a particular user or aggregate group of users. Portions of these timelines can be associated with particular search queries. For example, user interactions occurring after a search until purchase of an item matching the intent of the search (or addition of said item to a digital cart, wish list, or registry) can be associated with a search. As another example, user interactions occurring before a search can be associated with that search if they relate to the intent of the search, for example in the scenario of a user submitting multiple related search queries and browsing items in response to each query. Item user interaction data repository 534 can, for example in the ecommerce context, include item purchase histories, item viewing histories, item add histories (for example adding an item to a cart without subsequently purchasing the item or adding the item to a wish list or registry), item sharing, item ratings, item reviews, and the like. Outside of the ecommerce context an item can be a network page or web site visited by a user, a digital advertisement selected by a user, or other types of interactive digital content. In some embodiments, an item interaction event (e.g., user interaction event) may include an identifier for the item (for example, an item number, stock keeping unit (SKU), etc.), an indication of the type of interaction, or any other suitable information.

The query data repository 536 comprises one or more physical data storage devices that stores search queries and associated time data. As described herein, search queries can include one or more words and/or phrases. The search queries can be semantically parsed, and any attributes identified during the semantic parse can be stored in association with the query.

The interactive computing system 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the interactive computing system 500 and interact with items therein via the network 504 and can be provided with recommendations via the network 504.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system comprising:
   a datastore, the datastore storing item descriptions associated with a plurality of items included in an electronic catalog, wherein the items are organized according to a hierarchy, wherein the hierarchy comprises a plurality of categories and each item is associated with one or more of the categories; and
   one or more computers and non-transitory computer storage media storing instructions that when executed by the one or more computers, cause the one or more computers to perform operations comprising:
   obtaining information identifying items viewed by a user during a browsing session associated with an electronic catalog, the user interacting with the electronic catalog via a user device presenting a user interface of the electronic catalog;
   accessing the datastore, and obtaining attributes associated with the identified items, wherein obtaining attributes associated with the identified items comprises mapping a plurality of text strings extracted from item descriptions of the identified items to a common attribute;
   generating, during the browsing session for the obtained attributes, attribute relevance scores, wherein the attribute relevance scores are ranked, and wherein the attribute relevance scores indicate predicted levels of relevance of respective attributes to the user; and during the browsing session, using the attribute relevance scores to generate a personalized content page for the user.

2. The computing system of claim 1, wherein the operations further comprise extracting attributes associated with a plurality of items, the plurality of items being associated with a particular category, wherein the operations comprise:

obtaining item descriptions associated with the items, and extracting keywords from the item descriptions, the keywords being specific to the particular category;

associating one or more of the keywords with respective items of the plurality of items;

determining attributes based on the associated keywords, wherein each attribute is indicated as representing one or more of the keywords; and associating one or more attributes with each of the items.

3. The computing system of claim 1, wherein generating an attribute relevance score for a first attribute comprises determining a measure of time-decayed frequency, wherein the measure of time-decayed frequency is based on a number of the identified items which are associated with the first attribute and a measure of recency associated with viewing the identified items associated with the first attribute.

4. The computing system of claim 1, wherein generating an attribute relevance score for a first attribute comprises determining a measure of importance, wherein the measure of importance is based on a commonality of the first attribute with respect to items associated with the same category of items as the identified items.

5. The computing system of claim 1, wherein the operations further comprise, during the browsing session:

identifying items associated with a particular attribute with a highest attribute relevance score; and identifying one or more attributes associated with next highest attribute relevance scores, and filtering the identified items to retain items associated with the one or more attributes.

6. A method comprising: by a system of one or more computers, obtaining information identifying items viewed during a user browsing session, the items being included in an electronic catalog, and the electronic catalog being organized according to a hierarchy, wherein the hierarchy comprises a plurality of categories;

determining attributes associated with the identified items from the user browsing session, wherein determining attributes associated with the identified items comprises mapping a plurality of text strings extracted from item descriptions of the identified items to a common attribute; and during the user browsing session, generating attribute relevance scores for the attributes, ranking the attributes according to the attribute relevance scores, and generating a personalized content page for the user based at least partly on the ranking of the attributes, wherein the attribute relevance scores represent predicted levels of relevance of respective attributes to the user.

7. The method of claim 6, wherein generating an attribute relevance score for a first attribute comprises determining a measure of time-decayed frequency, wherein the measure of time-decayed frequency is based on (1) a number of the identified items which are associated with the first attribute and (2) a measure of recency associated with viewing the identified items associated with the first attribute.

8. The method of claim 6, generating an attribute relevance score for a first attribute comprises determining a measure of importance, wherein the measure of importance is based on a commonality of the first attribute with respect to items associated with the same category of items as the identified items.

9. The method of claim 8, wherein the measure of importance is based on a commonality of the first attribute with respect to a group of items, the group of items comprising popular items viewed by other users in respective browsing sessions which included at least one of the identified items.

10. Non-transitory computer storage media storing instructions that when executed by a system of one or more computers, cause the one or more computers to perform operations comprising:

obtaining information identifying items viewed during a user browsing session, the items being included in an electronic catalog, and the electronic catalog being organized according to a hierarchy, wherein the hierarchy comprises a plurality of categories;

determining attributes associated with the identified items from the user browsing session, wherein determining attributes associated with the identified items comprises mapping a plurality of text strings extracted from item descriptions of the identified items to a common attribute;

generating, for each of a plurality of the determined attributes, a respective attribute relevance score; and during the browsing session, ranking the attributes according to the respective attribute relevance scores and using the ranking of the attributes to generate a personalized content page for the user, wherein the attributes were extracted from item descriptions of the items.

11. The non-transitory computer-storage media of claim 10, wherein generating an attribute relevance score for a first attribute comprises determining a measure of time-decayed frequency, wherein the measure of time-decayed frequency is based on (1) a number of the identified items which are associated with the first attribute and (2) a measure of recency associated with viewing the identified items associated with the first attribute.

12. The non-transitory computer-storage media of claim 10, generating an attribute relevance score for a first attribute comprises determining a measure of importance, wherein the measure of importance is based on a commonality of the first attribute with respect to items associated with the same category of items as the identified items.

13. The non-transitory computer-storage media of claim 12, wherein the measure of importance is based on a commonality of the first attribute with respect to a group of items, the group of items comprising popular items viewed by other users in respective browsing sessions which included at least one of the identified items.

* * * * *